United States Patent [19]

Netz

[11] Patent Number: 5,575,528
[45] Date of Patent: Nov. 19, 1996

[54] MOTORCYCLE REAR FENDER COVER

[75] Inventor: Louis Netz, Grafton, Wis.

[73] Assignee: Harley-Davidson Motor Company, Milwaukee, Wis.

[21] Appl. No.: 361,987

[22] Filed: Dec. 22, 1994

[51] Int. Cl.⁶ .................................................. A47C 31/00
[52] U.S. Cl. ................................. 297/219.11; 297/195.1; 297/195.12
[58] Field of Search ........................... 297/219.11, 195.1, 297/195.11, 195.12, 215.1, 219.1, 463.1, 463.2

[56] References Cited

U.S. PATENT DOCUMENTS 4,691,963  9/1987  Mikuniya et al. ................. 297/195.12

FOREIGN PATENT DOCUMENTS

| | | | |
|---|---|---|---|
| 948486 | 8/1956 | Germany | 297/195.12 |
| 590485 | 4/1959 | Italy | 297/195.1 |
| 208214 | 4/1940 | Netherlands | 297/219.11 |
| 147102 | 9/1967 | U.S.S.R. | 297/195.1 |

*Primary Examiner*—Laurie K. Cranmer
*Attorney, Agent, or Firm*—Michael, Best & Friedrich

[57] ABSTRACT

A motorcycle seat has an arcuate rear portion and a front portion. A fender cover is fixed to the arcuate rear portion of the motorcycle seat and extending rearwardly therefrom. The fender cover comprising a thin section conforming generally to the contour of the upper portion of a motorcycle fender and including a base plate and a decorative top.

4 Claims, 2 Drawing Sheets

MOTORCYCLE REAR FENDER COVER

BACKGROUND OF THE INVENTION

This invention relates to motorcycle seats and more particularly to motorcycle seats having a protective and decorative cover for the rear motorcycle fender.

Motorcycles are generally provided with seats for either a single person, called a "solo" seat or a "dual" seat for both the rider and a passenger. When dual seats are provided, the passenger seat is positioned behind the rider's seat and extends over the front portion of the rear fender. When solo seats are employed, the rear fender remains generally uncovered.

SUMMARY OF THE INVENTION

It is the object of the invention to provide a new and improved motorcycle seat.

A further object of the invention is to provide a solo motorcycle seat which provides an aesthetically pleasing cover for the rear fender.

These and other objects and advantages of the present invention will become more apparent from the detailed description thereof taken with the accompanying drawings.

In general terms, the invention comprises a motorcycle seat, for being mounted on the frame of a motorcycle having a rear fender and including means for supporting the seat on motorcycle frame, the seat having an arcuate rear portion and a front portion, a fender cover affixed to the arcuate rear seat portion and extending rearwardly therefrom. The fender cover comprises a thin section which conforms generally to the contour of the upper portion of the rear motorcycle fender and being constructed and arranged to be positioned in close proximity thereto.

BRIEF DESCRIPTIONS OF THE DRAWING

DETAILED DESCRIPTION OF THE PREFERRED EMBODIMENT

Figure 1:
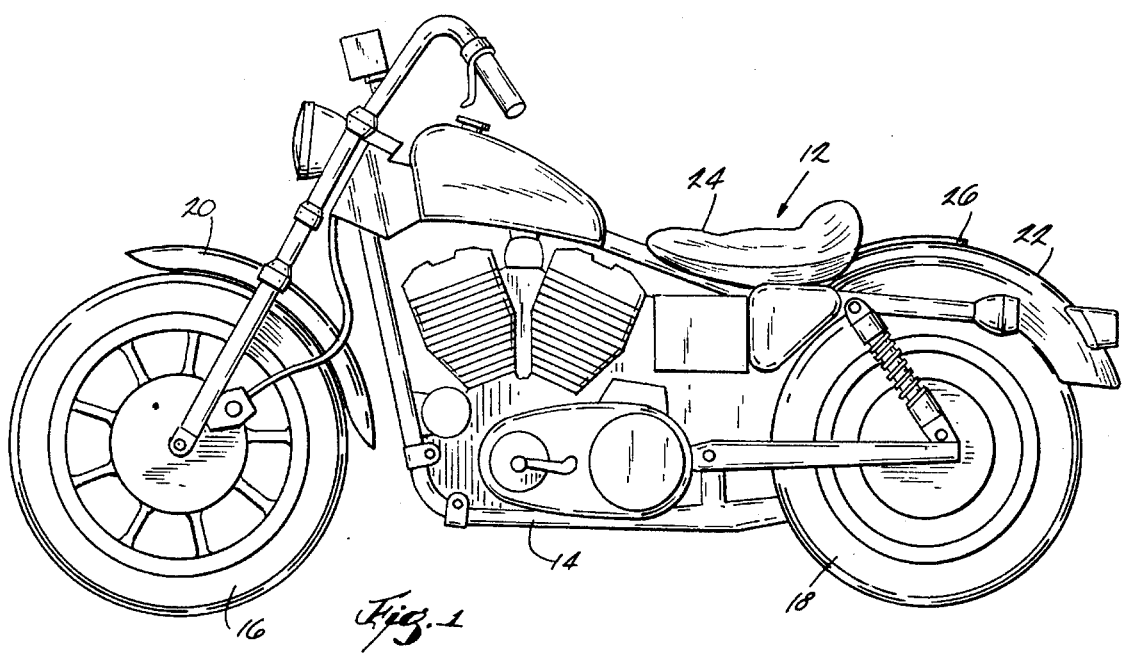
FIG. 1 is a prospective view of a motorcycle showing a motorcycle seat in accordance with the invention.
Figure 2:
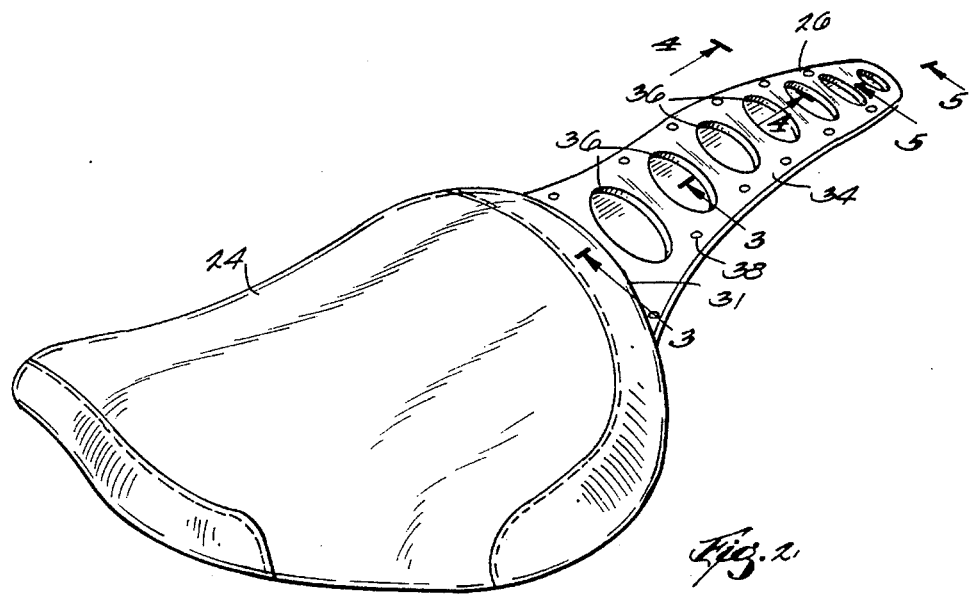
FIG. 2 is a prospective view of a motorcycle seat according to the invention.
Figure 3:
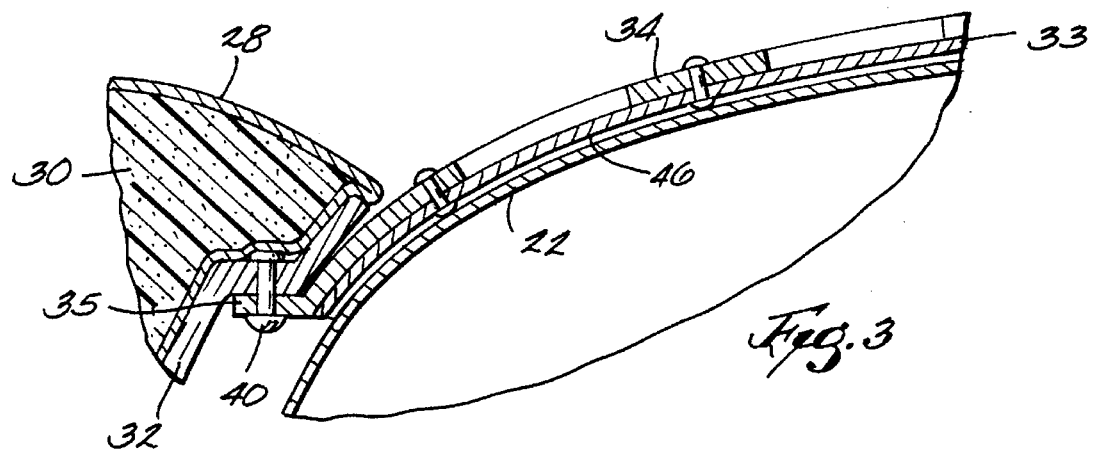
FIG. 3 is a view taken along lines 3—3 of FIG. 2.
Figure 4:
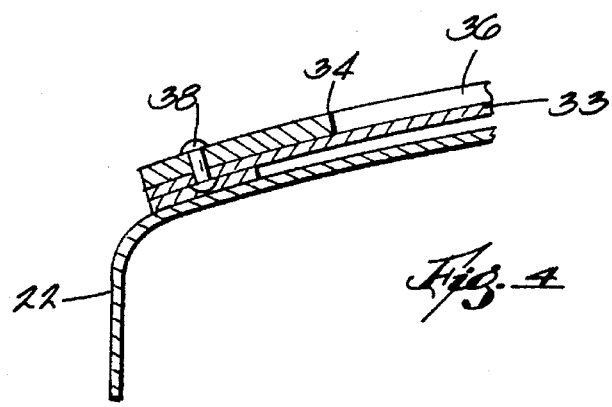
FIG. 4 is a view taken along lines 4—4 of FIG. 2.
Figure 5:
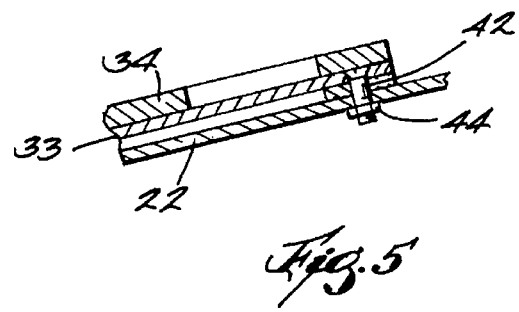
FIG. 5 is a view taken along lines 5—5 of FIG. 2.

FIG. 1 shows a motorcycle 10 having a seat assembly 12 according to the preferred embodiment of the invention. The motorcycle 10 includes a frame 14 for supporting the various components including the front wheel 16, the rear wheel 18, a front fender 20 and rear fender 22. While the rear fender may have any conventional shape, in the illustrated embodiment, it is arcuate in transverse and longitudinal section and extends downwardly around the front and rear portions of the rear wheel 18.

The seat assembly 12 includes a seat 24 and a fender cover 26 which is fixed to the seat 24 and extends rearwardly over a portion of the rear fender 22. The seat may be conventional and includes a cover 28 of any suitable material, such as leather or vinyl, and a foam filler 30. The cover 28 is fixed to a base 32, which may be formed of a metal or plastic material and the foam 30 is disposed therebetween. The rear portion 31 of the seat is arcuate in transverse and longitudinal sections. Those skilled in the art will appreciate that the base 32 is fixed to the motorcycle frame 14 by any suitable support, not shown.

The fender cover 26 is a thin metallic section which is slightly dished in longitudinal in transverse cross-section to conform generally to the contours of the upper portion of the fender 22. The front edge 35 of the fender cover 26 is complimentary to the arcuate rear portion 31 of the seat 24 and is attached thereto and extends backwardly therefrom. For aesthetic purposes, the cover 26 may include a bottom plate 33 and a decorative top plate 34. In the illustrated embodiment, the bottom plate 33 is full and the top plate 34 may have decorative cut-outs 36. Also for decorative purposes, the plates 33 and 34 may be formed of stainless steel or may be covered with chrome plating or another decorative coating. Any suitable fasteners, such as rivets 38 may be provided for joining the plates 33 and 34 around their peripheries. At its front end, the cover 26 is attached to the rear of the seat plate 32 in any suitable manner, such as by rivets 40. The rear of the cover 26 is fixed to the fender 22 by a fastener, such as a bolt 42 and a nut 44. A gasket 46 of a rubber or plastic materials preferably disposed between the cover 26 and rear fender 22 to prevent damage to the fender's finish.

Those skilled in the art will appreciate that the fender cover 26 is not intended to support a passenger but is for decorative and protective purposes only.

While only a single embodiment of the invention has been illustrated and described, it is not intended to limit thereby but only by the scope of the appended claims.

I claim:

1. A motorcycle seat for use with a motorcycle having a frame and a rear fender attached to the frame, means for supporting the seat on the frame, said seat having a rear portion, a fender cover fixed to the rear portion of the seat and extending rearwardly therefrom, said fender cover comprising a thin section constructed and arranged to extend over the motorcycle fender and preformed to define a shape complementary to at least a portion of the rear fender and composed of a material which generally retains said configuration, and attachment means for attaching said fender cover to the rear fender of a motorcycle at a point spaced from the rear portion of the seat.

2. The motorcycle seat set forth in claim 1 wherein said fender cover is arcuate in longitudinal in transverse section.

3. The motorcycle seat set forth in claim 2 wherein said fender cover comprises a base member and a decorative member disposed on said base member.

4. The motorcycle seat set forth in claim 3 wherein said fender cover has a front portion complementary with and affixed to the rear portion of said seat and a rear portion at the opposite end thereof, said attachment means being disposed at the rear portion of the fender cover for attaching the rear portion of said fender cover to the rear fender of a motorcycle.

* * * * *